(No Model.)
D. A. HUDELSON.
CUTTER AND FENDER ATTACHMENT FOR PLOWS.
No. 274,333. Patented Mar. 20, 1883.
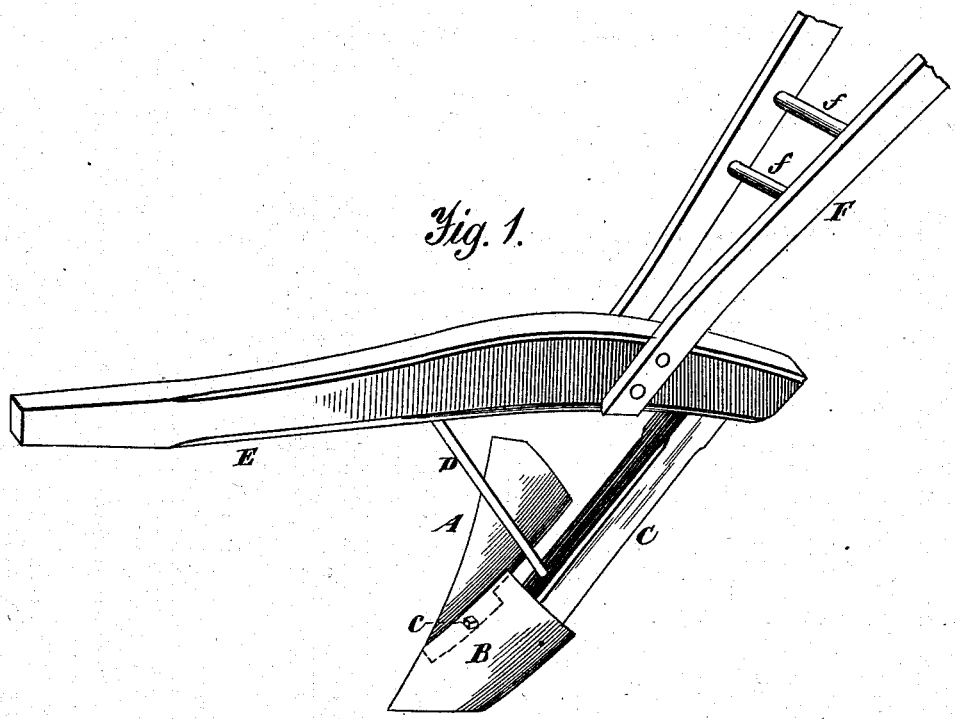
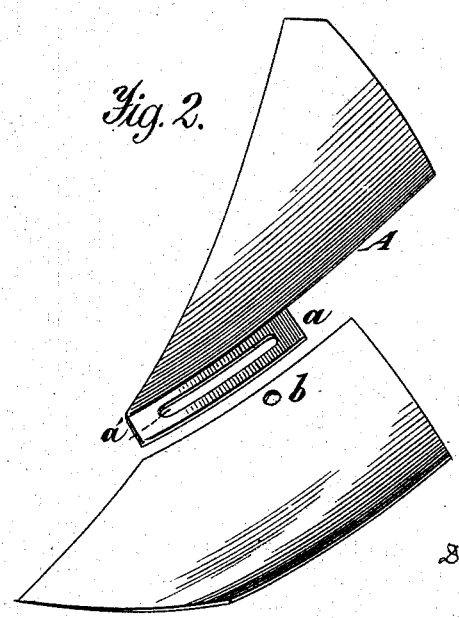
Witnesses.
A. Ruppert.
Wm. N. Bates
Inventor.
D. A. Hudelson
Holloway & Blanchard
Attys

UNITED STATES PATENT OFFICE.

DAVID A. HUDELSON, OF DUNREITH, INDIANA.

CUTTER AND FENDER ATTACHMENT FOR PLOWS.

SPECIFICATION forming part of Letters Patent No. 274,333, dated March 20, 1883.

Application filed August 24, 1882. (No model.)

*To all whom it may concern:*

Be it known that I, DAVID A. HUDELSON, a citizen of the United States, residing at Dunreith, in the county of Henry and State of Indiana, have invented certain new and useful Improvements in Cutter and Fender Attachments for Plows, of which the following is a specification, reference being had therein to the accompanying drawings.

This invention has relation to improvements in fenders and cutters for plows and the attachment of the same to the shares or shovels thereof; and it consists in the novel construction and arrangement of the several parts, as will be hereinafter more fully described, and specifically pointed out in the claim.

In the accompanying drawings, which fully illustrate my invention, Figure 1 is a side view of my improved cutter and fender attachment, and Fig. 2 is a detached view of cutter and shovel.

A represents the fender or cutter, provided with a slotted flange, $a$, or the same forming a part thereof, by casting or otherwise, and secured to the lower edge at about half-way of the cutter and at right angles to the same, this flange being provided with a slot, $a'$, through the medium of which the cutter is adjusted to regulate the depth of the soil upon the plowshare or shovel B, by means of a bolt passing through the slot $a'$ of the fender, and a hole, $b$, in the plowshare or shovel B, and by which they are also attached rigidly and securely together and held in place by a nut, $c$.

The aforesaid cutter or fender A has its upper and lower edges slightly curved from its point or forward end rearwardly and upwardly, the blade diverging in such a manner as to gradually increase the width of the blade at its rear end, and by which greater or less depth is acquired.

B is the plow-shovel, which is of ordinary construction, and which is secured firmly to the plow-standard C at its lower end. This standard C has also a brace, D, one end of which is let into the standard near its lower end, and the other end of the brace, as well as the standard, secured to the plow-beam E, by mortising or otherwise, on its under side, the standard and brace resembling the letter V in form.

F F are handles, the lower ends of which are attached in any suitable manner to the beam E, and having rounds or braces $f f$, this construction of the beam, shovel, standard, and handles being of the ordinary construction, my invention being simple in construction, durable, and cheap to manufacture.

Having thus described my invention, I will now proceed to explain the operation of the same.

When the plow is to be put into operation it is only necessary for the operator to place the oblong slot in the flange of the cutter over the hole in the plow-shovel, securing them together just sufficiently tight, by means of the bolt and nut, that said cutter can be adjusted by the movement of the same over the bolt from front to rear on the shovel, and which movement, by the gradual increase of width of the cutter, increases the depth to which the soil can be penetrated by the shovel, and at the same time the fender or cutter protects the shovel from any obstructions while plowing; and as this fender is so very close to the plow, or forming a part thereof when cast or secured to it, it separates the dirt before it leaves the plow, and as it is between the plow and corn it enables the operator to go as near the corn as he wishes, and no dirt is liable to get on the corn in so doing, and the cutter separates and takes all weeds and grass from the corn that may be mixed with it after being turned by the plow, nor is the corn liable to be pulled down out of place.

I am aware that a colter and fender has been made with curved ends to throw the dirt away from the corn when in use. This I do not broadly claim; but What I do claim is—

The fender A, curved outward from the shovel in segmental form, and widening backward from the point, and provided with the flange $a$, having a longitudinal slot, $a'$, in combination with the shovel B, having bolt-hole $b$, substantially as shown and described.

In testimony whereof I affix my signature in presence of two witnesses.

DAVID A. HUDELSON.

Witnesses:
MORRIS T. PEARCE,
M. H. NEARSON.